(12) United States Patent
Lovich (10) Patent No.: US 11,191,024 B2
(45) Date of Patent: Nov. 30, 2021

(54) METHOD FOR POWER-SAVING FOR WIRELESSLY PAIRED DEVICES

(71) Applicant: Google LLC, Mountain View, CA (US)

(72) Inventor: Vitali Lovich, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/243,758

(22) Filed: Jan. 9, 2019

(65) Prior Publication Data
US 2020/0154358 A1    May 14, 2020

Related U.S. Application Data

(60) Provisional application No. 62/757,476, filed on Nov. 8, 2018.

(51) Int. Cl.
*H04W 52/02* (2009.01)
*H04L 12/26* (2006.01)

(52) U.S. Cl.
CPC ..... *H04W 52/0241* (2013.01); *H04L 43/0876* (2013.01)

(58) Field of Classification Search
CPC ............. H04W 52/0241; H04L 43/0876
See application file for complete search history.

(56) References Cited

U.S. PATENT DOCUMENTS

| | | | |
|---|---|---|---|
| 9,794,670 B2 | 10/2017 | Rodzevski et al. | |
| 9,924,010 B2 | 3/2018 | Watson et al. | |
| 10,432,773 B1* | 10/2019 | Tong | H04B 5/0006 |
| 2009/0197532 A1* | 8/2009 | Wyper | H04M 1/6066 |
| | | | 455/41.2 |
| 2016/0014492 A1* | 1/2016 | McCarthy | H04R 1/1016 |
| | | | 381/74 |
| 2016/0066127 A1* | 3/2016 | Choi | H04W 12/50 |
| | | | 455/41.2 |

(Continued)

FOREIGN PATENT DOCUMENTS

| | | |
|---|---|---|
| CN | 104270499 A | 1/2015 |
| CN | 104349241 A | 2/2015 |

(Continued)

OTHER PUBLICATIONS

Partial International Search Report for Appl. No. PCT/US2019/056775 dated Dec. 17, 2019, 3 pages.

(Continued)

*Primary Examiner* — Mazda Sabouri
(74) *Attorney, Agent, or Firm* — Lerner, David, Littenberg, Krumholz & Mentlik, LLP (57) ABSTRACT

The present disclosure provides for power conservation in truly wireless earbuds or other paired wireless devices, by switching a secondary device into a power save mode when the devices are not receiving traffic from the host. In this power-save mode the devices are put into a lower duty cycle than conventional configuration. The primary and secondary devices communicate over a backchannel communication link at a very low duty cycle, in some examples below lower bounds specified for standard communication with other devices. The primary earbud may be responsible for letting the secondary earbud know when to leave power-save mode and resume regular operation.

19 Claims, 7 Drawing Sheets

(56) References Cited

U.S. PATENT DOCUMENTS

| | | | |
|---|---|---|---|
| 2016/0119708 A1* | 4/2016 | Rodzevski | H04R 1/1041 |
| | | | 381/74 |
| 2017/0094389 A1 | 3/2017 | Saulsbury et al. | |
| 2017/0155992 A1* | 6/2017 | Perianu | H04R 1/1016 |
| 2017/0195466 A1* | 7/2017 | Chen | H04R 1/1025 |
| 2017/0195771 A1* | 7/2017 | Hung | G06F 3/165 |
| 2017/0311105 A1* | 10/2017 | Hariharan | H04R 29/001 |
| 2018/0014103 A1* | 1/2018 | Martin | H04R 1/1025 |
| 2018/0091381 A1* | 3/2018 | McLaughlin | G06F 9/451 |
| 2018/0152979 A1* | 5/2018 | Lee | H04W 4/80 |
| 2018/0277123 A1* | 9/2018 | Boesen | G10L 17/22 |
| 2018/0279038 A1* | 9/2018 | Boesen | H04R 1/1016 |
| 2018/0359348 A1* | 12/2018 | Katkam | H04M 1/6066 |
| 2019/0174232 A1* | 6/2019 | Tong | H04R 5/033 |
| 2019/0200113 A1* | 6/2019 | Kim | H04M 1/6058 |
| 2019/0336055 A1* | 11/2019 | Shah | A61B 5/0004 |

FOREIGN PATENT DOCUMENTS

| | | |
|---|---|---|
| CN | 105430544 A | 3/2016 |
| CN | 106209130 A | 12/2016 |
| EP | 1404026 A1 | 3/2004 |
| WO | 2018026201 A1 | 2/2018 |

OTHER PUBLICATIONS

International Search Report and Written Opinion for International Application No. PCT/US2019/056775 dated Feb. 12, 2020 19 pages.

Notification of the First Office Action for Chinese Patent Application No. 201980025548.2 dated Jul. 22, 2021. 15 pages.

\* cited by examiner

METHOD FOR POWER-SAVING FOR WIRELESSLY PAIRED DEVICES

CROSS-REFERENCE TO RELATED APPLICATIONS

The present application claims the benefit of the filing date of U.S. Provisional Patent Application No. 62/757,476 filed Nov. 8, 2018, the disclosure of which is hereby incorporated herein by reference.

BACKGROUND

Truly wireless earbuds include a wireless connection between a primary earbud and a secondary earbud, as well as a wireless connection with a host device. This is implemented by either incorporating an independent Bluetooth chip into each of the primary and secondary earbuds, or by incorporating a Bluetooth chip into one of the earbuds and using near field magnetic induction (NFMI) to synchronize with the other earbud. For independent Bluetooth chip case, the earbuds must maintain an active connection with the host. Alternatively the primary earbud maintains the connection with the host, and the secondary earbud connects to the primary earbud or passively spies on traffic.

When the earbuds are not receiving traffic from the host, they enter a standby mode. During standby, both earbuds need to periodically wake up the radio to determine if the host or the other earbud have traffic to send.

BRIEF SUMMARY

One aspect of the disclosure provides a method of power conservation in a wireless accessory, including operating in a normal mode, including receiving at the wireless accessory media packets from a host device, determining, by the wireless accessory, that the media packets are no longer being transmitted by the host device, switching, by the wireless accessory, to a power save mode in response to determining that the media packets are no longer being transmitted, listening, by the wireless accessory in the power save mode, for pre-warming notifications over a backchannel communication link with another wireless accessory, and in response to receiving the pre-warming notifications, returning to the normal mode.

Where media packets are received directly from the host, switching to the power save mode may further include negotiating, with the other wireless accessory, primary and secondary roles, and establishing by the wireless accessory, the backchannel communication link with the other wireless accessory. It may further include disconnecting, by the wireless accessory, from the host device.

Another aspect of the disclosure provides a system, including a first wireless accessory device and a second wireless accessory device. The first wireless accessory device includes one or more processors, an interface for communicating with a host device, wherein the first wireless accessory is adapted to receive media packets from the host device. The second wireless accessory device includes one or more processors, an interface for communicating with the first wireless accessory device over a backchannel communication link, wherein the one or more processors of the second wireless accessory is further configured to switch operation of the second wireless accessory between a normal operating mode in which the second wireless accessory device receives media packets, and a power-save mode in which the second wireless accessory device does not receive or playback media packets, and listens for a pre-warming event.

Yet another aspect of the disclosure provides a wireless accessory device, comprising a communication interface adapted to establish a backchannel communication link with another wireless accessory, a memory storing instructions for switching between a normal operating mode and a power save mode, and one or more processors in communication with the interface and the memory. The one or more processors are configured to cause the wireless accessory to operate in a normal mode in which it receives media packets from a host device, determine that the media packets are no longer being transmitted by the host device, cause the wireless accessory to switch to a power save mode in response to determining that the media packets are no longer being transmitted, listen, in the power save mode, for pre-warming notifications over the backchannel communication link with the other wireless accessory, and in response to receiving the pre-warming notifications, cause the wireless accessory to return to the normal mode.

DETAILED DESCRIPTION

The present disclosure provides for power conservation in truly wireless earbuds or other paired wireless devices, by switching a secondary device into a power save mode when the devices are not receiving traffic from the host. In this power-save mode the devices are put into a lower duty cycle than conventional configuration.

The secondary earbud may use a low duty cycle link directly to the primary bud in standby mode regardless of how the devices work during a traffic-receiving mode. For example, for truly wireless devices that both connect to the host, one of the devices may become the primary device via a negotiation protocol or other protocol. The other device may become the secondary device and switch to the power save mode. For example, the secondary device may disconnect from the host and use a link to the primary bud while in the power save mode. The earbud-to-earbud connection is tuned to use a very low duty cycle on the radio. The primary earbud may be responsible for letting the secondary earbud know when to leave power-save mode and resume regular operation.

The radio parameters for this low duty cycle link can be more precisely controlled than in regular operation. For example, the earbuds in standby mode on a user's head have a known orientation relative to each other with fixed cross-body effects that can be mostly tuned ahead of time in laboratory environments. As another example, leaving standby mode has much higher tolerances than in normal operating modes because it might take time to initiate and buffer an audio stream on the host, but the transition from silence to audio playback is already one users have become accustomed to being not necessarily instant.

In another implementation, the secondary device turns off its Bluetooth radio completely. For example, the secondary device may use a different even more low-power technology, such as NFMI, a low-bandwidth link using direct skin conductance, etc., for the back-channel to control leaving standby.

Latency impacts may be mitigated by pre-warming the secondary bud opportunistically. For example, the secondary bud may wake up to listen for traffic at predetermined times or in response to particular events, such as application launch, incoming notification detected at low-levels of the operating system before it reaches applications, low-level telephony events, etc. Moreover, a feedback mechanism may be provided to let the host know when both earbuds are ready for low-latency operation. In this regard, a user of the earbuds may be notified through the host device, such as through an on-display message, a vibration, etc., at virtually a same time that auditory feedback is provided in the earbuds.

The present system and method allow part of a truly wirelessly paired system to save battery more aggressively while hiding the latency impact from the user. Where the system includes paired Bluetooth devices, such as earbuds, the devices may be manufactured using parameters outside of Bluetooth standards even when connecting to legacy host devices, because the low-latency link is between the Bluetooth devices. For example, the secondary device in power save mode can draw even less power than a lower bound set forth in Bluetooth standards without compromising compatibility with the host device. Additionally, the primary and secondary devices can switch roles periodically or in response to predetermined events, such as low battery levels of the primary device, for battery levelling and prolonging the use of both earbuds between charging sessions.

Figure 1A:
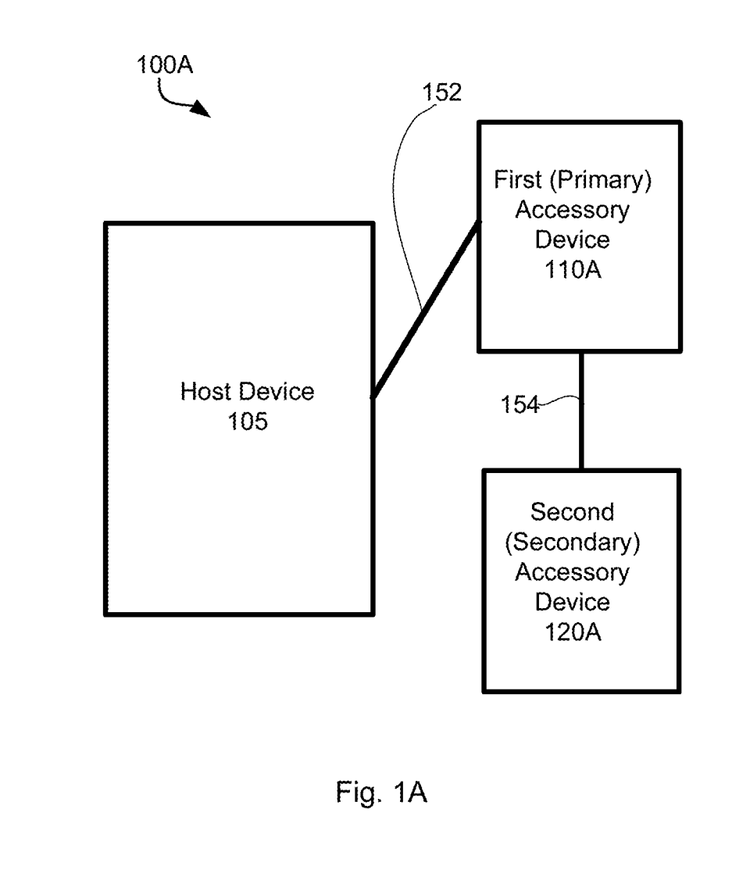
FIGS. 1A-B are block diagrams illustrating example systems according to aspects of the disclosure.
Figure 1B:
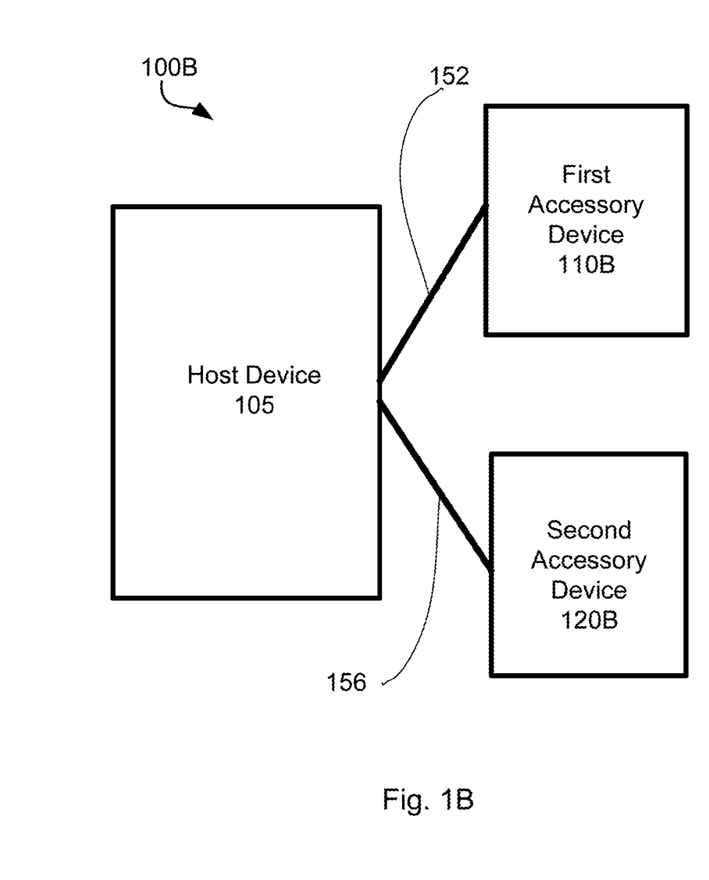

FIGS. 1A-B illustrate example systems 100A, 100B, each including a host device 105 communicatively coupled to a wireless accessory device. In each example, the wireless accessory device includes a plurality of devices, such as a pair of earbuds, a plurality of wireless speakers, etc. While only two accessory devices are shown in each example, it should be understood that any number of wireless accessory devices may be included. Moreover, the accessory devices may all be of a same time, such as earbuds, or may be a combination of different types, such as an earbud and a wireless speaker.

In the example 100A of FIG. 1A, the wireless accessory devices include a first accessory device 110A serving in a primary role and a second accessory device 120A serving in a secondary role. The first accessory device 110A is in direct wireless communication with the host device 105 through host communication link 152. The first accessory device 110A is further communicatively coupled to secondary accessory device 120A through wireless device communication link 154. The connections 152, 154 between the devices 105, 110A, 120A may be, for example, short range wireless pairing, such as Bluetooth, NFMI, or other wireless communication protocols. The host device 105 may send information, such as audio packets, to the primary device 110A via the host communication link 152. The primary device 110A may relay information, such as audio packets, received from the host over communication link 152 to the secondary device 120A over the communication link 154.

In the system 100B of FIG. 1B, first and second accessory devices 110B, 120B do not serve in primary and secondary roles, but rather have separate communication links 152, 156 to the host 105. As such, each of the first and second accessory devices 110B, 120B operates independently of one another, and communicates directly with the host 105.

Figure 2A:
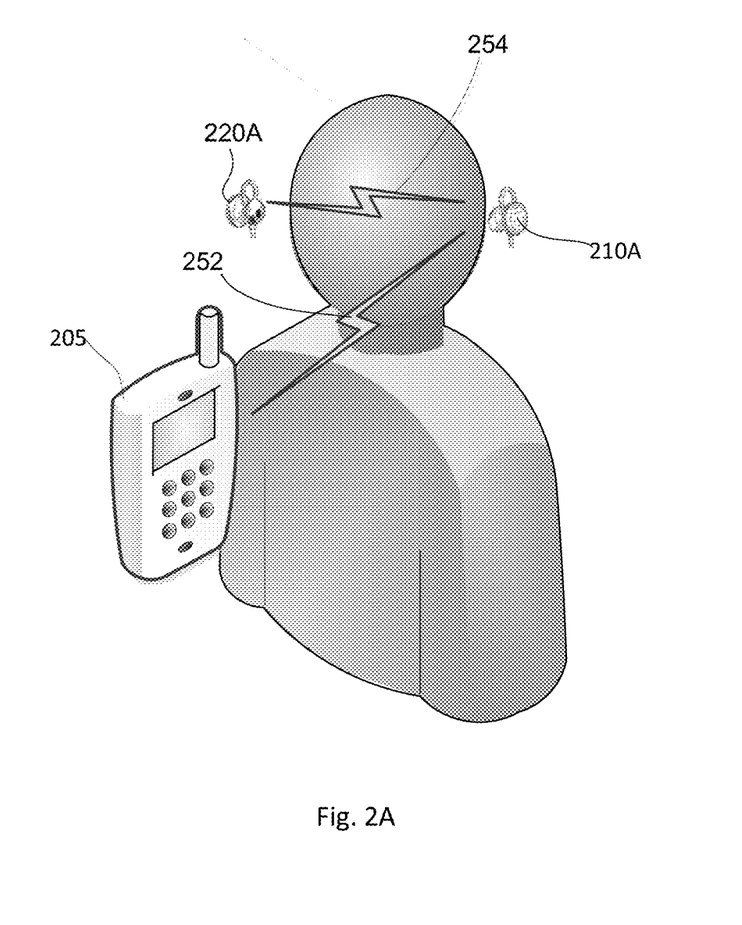
FIGS. 2A-B are example pictorial diagrams of the systems of FIGS. 1A-B.
Figure 2B:
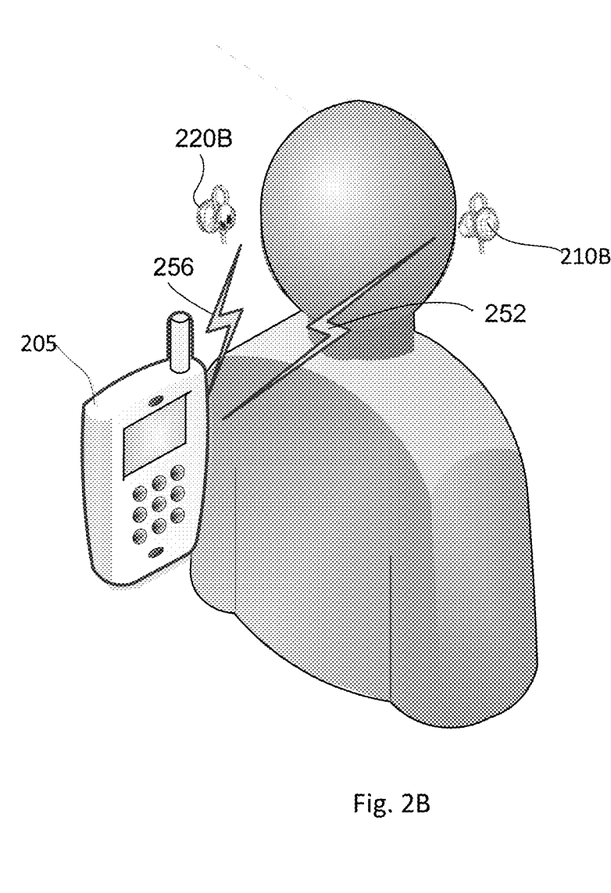

FIGS. 2A-B illustrate examples of the systems of FIGS. 1A-B, wherein the host device is a mobile phone 205 and the wireless accessory devices are earbuds. For example, in FIG. 2A, host communication link 252 exists between the phone 205 and first (primary) earbud 210A, while relay communication link 254 exists between the first earbud 210A and second (secondary) earbud 220B. In FIG. 2B, host communication link 252 exists between the phone 205 and first earbud 210B, and a second host communication link 256 exists between the phone and second earbud 220B.

While the host device in this example is illustrated as a mobile phone, it should be understood that the host device may be any of various types of devices adapted to transmit audio signals. For example, the host device may be a tablet, smart watch, game system, music player, laptop, personal digital assistant device, or any other computing device. Similarly, the first and second accessories, while here shown as earbuds, may in other examples be any combination of speakers or other audio devices, video output displays, etc. The first and second accessories may be paired during a time of manufacture, or may be sold separately and paired later by a user.

In some instances, it may be desirable to transition the second earbud 220A, 220B to a very low power mode. For example, if the second earbud 220A, 220B is not in use, it may be transitioned from a normal operating mode, in which it listens for packets from either the first earbud or the host, to a low power mode which conserves even more power than a conventional standby mode.

Figure 3:
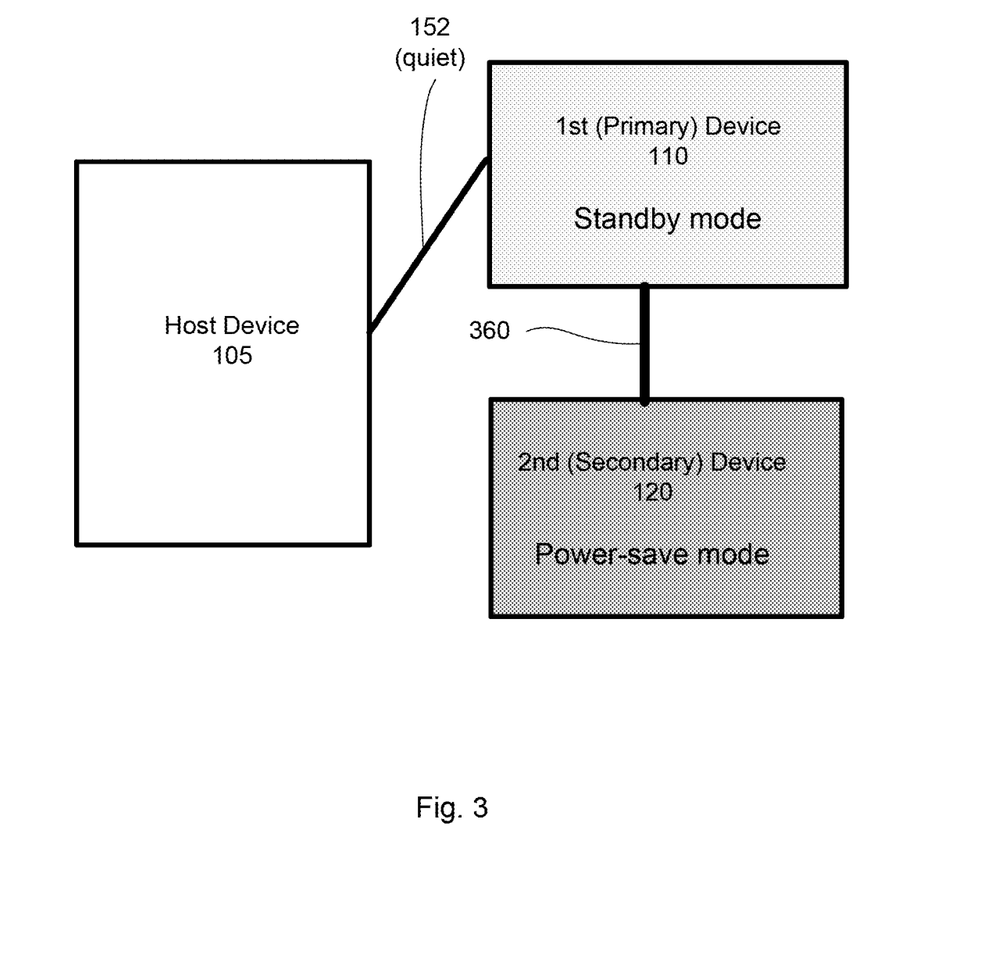
FIG. 3 is a block diagram illustrating power save mode according to aspects of the disclosure.

FIG. 3 illustrates an example of either system 100A, 100B where the second device is in the low power mode. For example, the host communication link 152 may be quiet, such as if no audio or video packets are being transmitted from the host 105 to the first device 110. While first device 110 may therefore transition to a standby mode, second device 120 may transition to a power-save mode, in which the second device 120 is put into a lower duty cycle than in conventional standby mode. In the power save mode, the second device 120 may completely turn off it's Bluetooth radio and use an out-of-band mechanism for signalling with the first device 110 about when to leave the power-save mode. The out-of-band mechanism may be, for example, using non-audible sounds to chirp to each other, using a different low-power/low-bandwidth radio technology, establishing a body area network via skin capacitance, or any of a variety of other mechanisms.

The second device 120 connects to the first device using backchannel link 360. The backchannel link 360 may be the same as the relay link 154 of FIG. 1A, or it may be a separate link used only for particular communications, such as waking the second device 120. The backchannel link 360 may be, for example, a Bluetooth low energy (BLE) link, NFMI, skin conductance, or other type of link. The backchannel link 360 may be tuned to use a very low duty cycle on the radio. The first earbud 110 may be responsible for letting the second earbud 120 know, through the backchannel link 360, when to leave power-save mode and resume regular operation in normal mode.

For systems without primary/secondary modes, such as the system 100B of FIG. 1B, to transition to the power save mode shown in FIG. 3, one of the first device or the second device may become the primary device while the other becomes the secondary device. For example, the first and second devices may negotiate which will become the primary, such as through a negotiation protocol. Such negotiation may be based on, for example, battery level, signal strength connection with the host 105, or other conditions. In other examples, one of the first or second device may be pre-designated as the device to become the primary when transitioning to the power save mode. The device that becomes the secondary device may disconnect from the host and connect with the primary device, such as through the backchannel link 360. In some examples, the secondary device 120 may even turn off its Bluetooth radio completely, and use a different, even more low-power technology for the back-channel to control leaving standby. For example, in such cases the secondary device 120 may use NMFI, a low-bandwidth link via direct skin conductance, etc.

Figure 4:
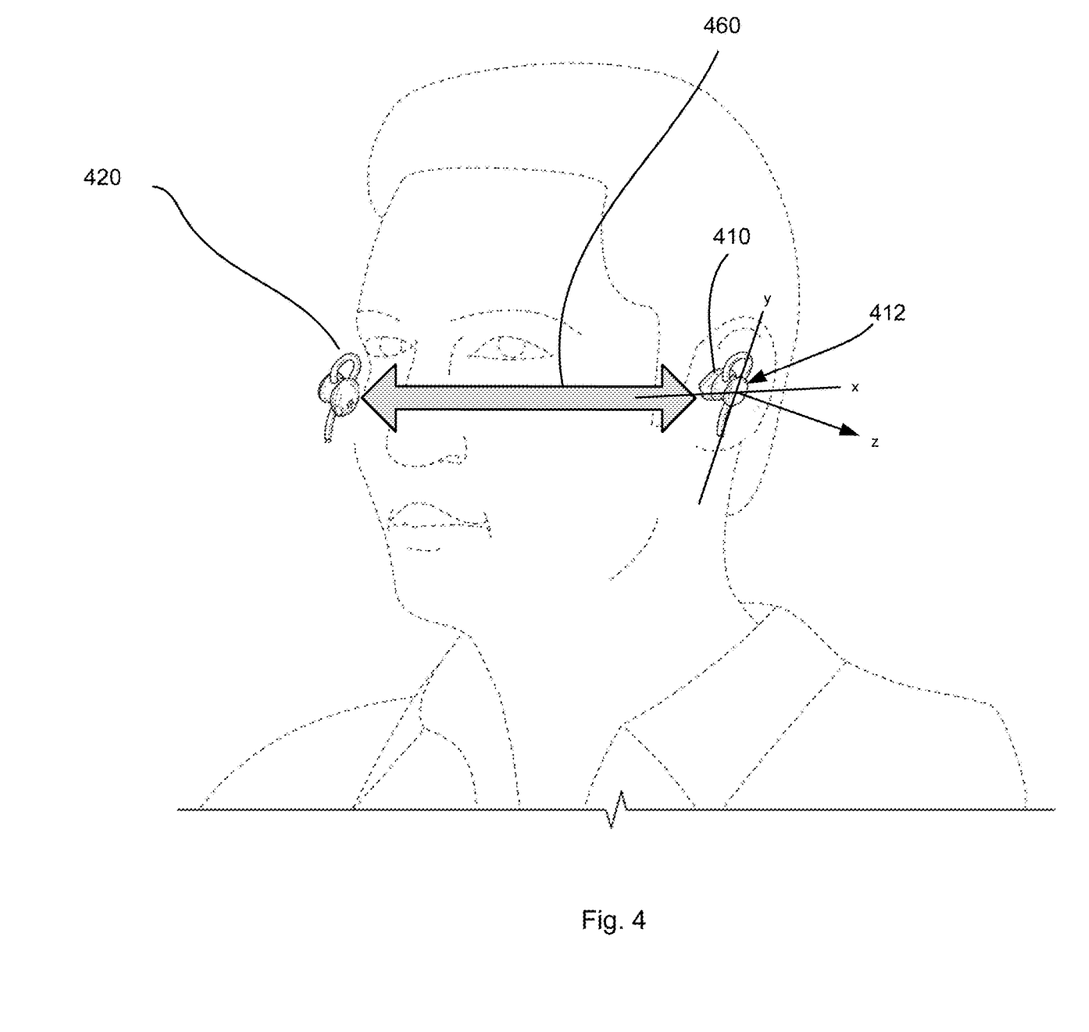
FIG. 4 is a pictorial diagram illustrating an example a low duty cycle radio link between devices having a known relative orientation according to aspects of the disclosure.

FIG. 4 illustrates an example of wireless earbuds 410, 420 on a user's head 480. The earbuds 410, 420, when worn on the user's head 480, have a known orientation relative to each other. For example, an antenna for each earbud 410, 420 may be positioned near an outer portion 412 of the earbud which is exposed when an inner portion is inserted into the user's ear. The antenna may be angled in a particular x, y, z, orientation at a particular distance from an antenna of the other earbud, which may be correspondingly angled on an opposite side of the user's head. Moreover, when worn on the user's head 480, the earbuds 410, 420 have fixed cross-body effects. For example, noise or interference in a backchannel link 460 between the earbuds 410, 420 caused by presence of the user's head 480 do not substantially change from one time to another. In view of the known orientation and cross-body effects, the earbuds 410, 420 can be mostly tuned ahead of time, such as in laboratory environments or at a manufacturer.

Because the earbuds 410, 420 can be mostly tuned ahead of time, radio parameters for the low duty cycle link 460 can be precisely controlled. For example, radio parameters such as sniff interval and transmit/receive power may be precisely controlled.

Another aspect providing for precise control of radio parameters for the low duty cycle backchannel link 460 is that leaving standby mode has much higher tolerated delay time than in normal operating modes. For example, it might take time to initiate and buffer an audio stream on the host. such as for internet streaming, where the silence-to-audio transition is one for which users have already become accustomed to waiting. For example, for phone calls, a non-realtime ringing sound precedes the realtime conversation, music playback and announcements aren't realtime, etc. The delay for the device in power-save mode to return to normal operating mode can be higher, because audio buffers need to be filled anyway. This delay can be used to hide the transition to the normal operating mode and re-establishing the active audio connection.

Latency associated with leaving the power-save mode may be mitigated by pre-warming the secondary bud opportunistically. For example, a pre-warming event, such as launch of an application, low-level operating system notification, etc., may trigger pre-warming by the secondary device. Even with a non-zero false-positive rate, such as if the secondary device leaves the power-save mode in response to a pre-warming event that was not following by transmission of audio packets from the host to the primary device, entry into the power-save mode will still result in reduced power consumption and prolonged battery life.

Figure 5A:
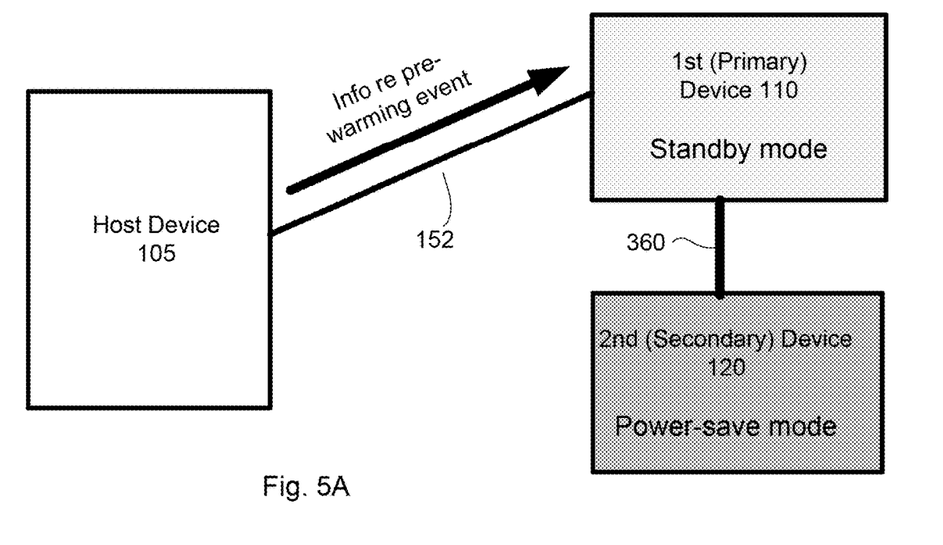
FIGS. 5A-B illustrate pre-warming according to aspects of the disclosure.
Figure 5B:
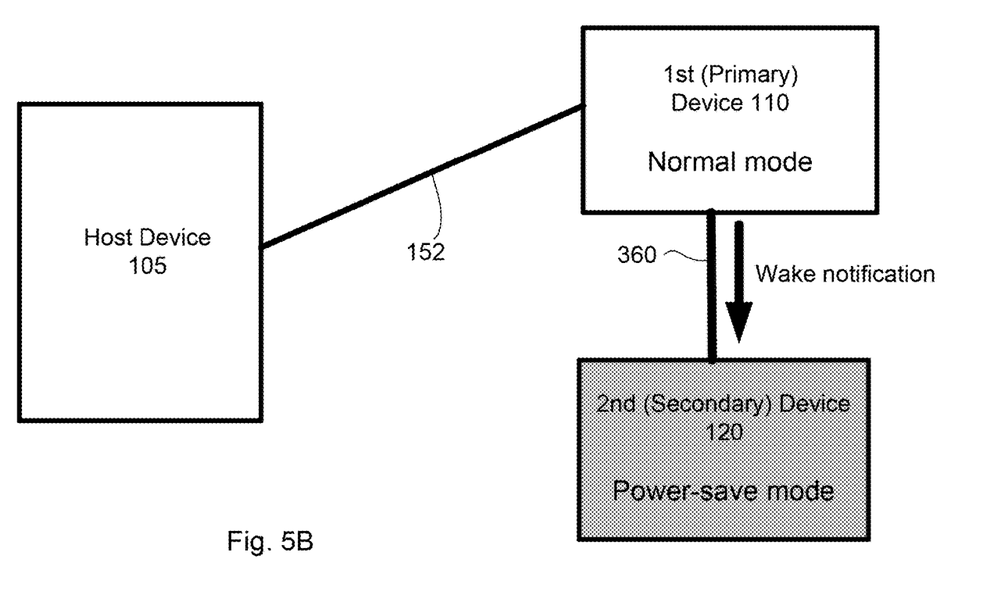

FIGS. 5A-B illustrate an example of pre-warming the secondary device 120. The primary device 110 may detect a pre-warming event. One example of a pre-warming event may include launch of an application for which playback through the devices 110, 120 may be desired. For example, if the host 105 launches or resumes an application with a media player, the host 105 may send a notification to the primary device 110. Another example includes an assistant running on the host 105. The assistant may detect a possible need for playback, and cause a notification to be sent to the primary device 110.

Upon receipt of the pre-warming notification, the primary device 110 may return to normal operating mode and send a wake notification to the secondary device 120, as shown in FIG. 5B. In some examples, the primary device 110 may send the wake notification prior to or simultaneously with returning to the normal mode. The secondary device 120, upon receipt of the notification, may also wake, returning to normal mode.

While the examples of FIGS. 5A-B illustrate the notifications regarding a pre-warming event being sent from the host 105 to the primary device 110 and then from the primary device 110 to the secondary device 120, in other examples the secondary device 120 may be sniffing for traffic from the host 105. Accordingly, the secondary device 120 may decide to leave the power-save mode on its own, without notification from the primary device 110.

According to some examples, a feedback mechanism may be provided to inform the host 105 when both devices 110, 120 are ready for low-latency operation. Feedback may also be provided to a user via the host 105, such as through an on-screen notification, a physical vibration, etc., and/or through the devices 110, 120, such as via audible feedback through earbuds. In some instances where feedback is provided through both the host 105 and the devices 110, 120, such feedback may be synchronized such that there is no detectable difference in timing to the user.

Figure 6:
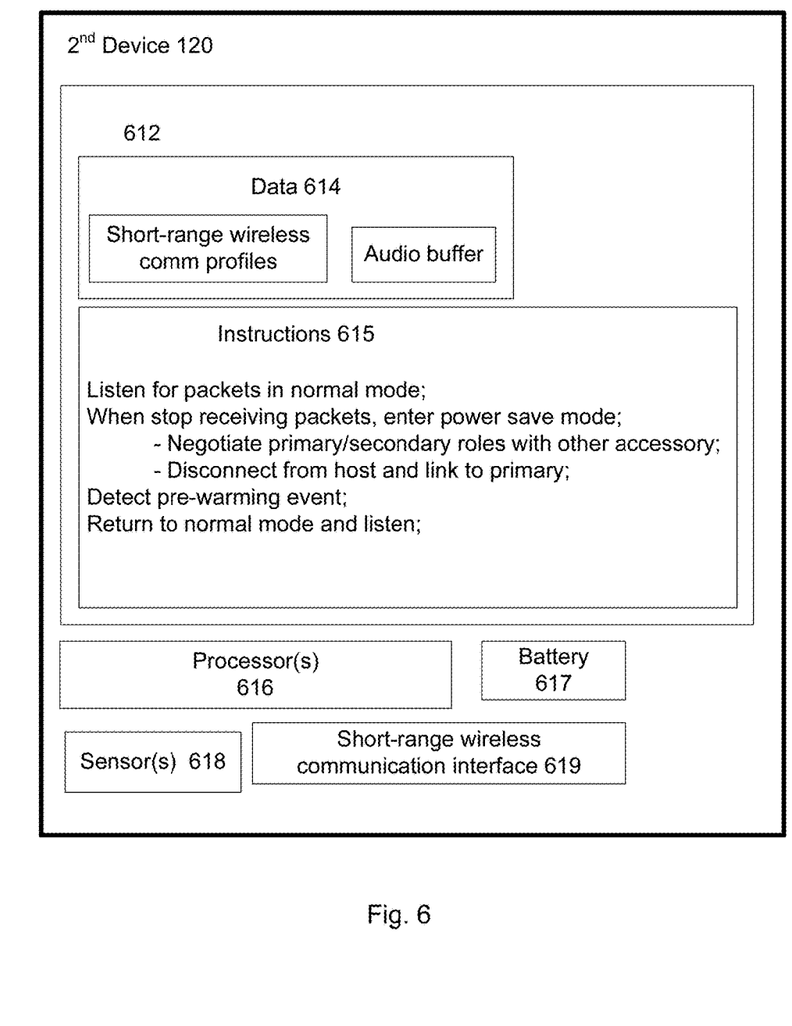
FIG. 6 is a functional block diagram illustrating an example accessory device according to aspects of the disclosure.

FIG. 6 illustrates an example of internal components of a wirelessly paired accessory device, such as the secondary device 120. While a number of internal components are shown, it should be understood that additional or fewer components may be included. By way of example only, the devices may include components typically found in playback devices, such as speakers, microphones, etc. The devices may be, for example, wireless accessories, such as earbuds, portable speakers, displays, etc. While the below description relates primarily to the secondary device 120, it should be understood that the primary device 110 may be similar or identical. In some examples, however, the primary and secondary devices 110, 120 may be different types of devices, or have different internal components.

The secondary device 120 may include one or more processors 616, one or more memories 612, as well as other components. For example, the device 120 may include one or more sensors 618, wireless pairing interface 619, and a battery 617.

The memory 612 may store information accessible by the one or more processors 616, including data 614 instructions 615 that may be executed or otherwise used by the one or more processors 616. For example, memory 612 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 612 may be a static random-access memory (SRAM) configured to provide fast lookups. Systems and methods may include different combinations of the foregoing, whereby different portions of the instructions and data are stored on different types of media.

The data 614 may be retrieved, stored or modified by the one or more processors 616 in accordance with the instructions 615. For instance, data 614 may include short range wireless communication profiles, such as Bluetooth profiles. The data 614 may further include buffered packets, such as an audio buffer with packets received from a host device. Although the claimed subject matter is not limited by any particular data structure, the data may be stored in computing device registers, in a relational database as a table having a plurality of different fields and records, XML documents or flat files. The data may also be formatted in any computing device-readable format.

The instructions 615 may be any set of instructions to be executed directly (such as machine code) or indirectly (such as scripts) by the one or more processors 616. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. The instructions 615 may be executed to switch the secondary device 120 between a normal operating power and a power-save mode in which the device 120 turns off a number of functionalities to conserve power while audio packets are not being transmitted to the device 120. For example, the device 120 listen for packets in a normal operating mode, and enters a power save mode when packets are no longer being received. If the device 120 normally operates with a direct connection to the host, switching to power save mode may include negotiating primary/secondary roles with another paired device, and in the secondary role disconnecting from the host and link to the primary device, such as through a backchannel communication link. The device 120 further detects a pre-warming event, such as by receiving a notification from the primary device through the backchannel communication link, and returns to normal mode where it listens for further audio, video, or other media packets. Functions, methods and routines of the instructions are explained in more detail below.

The one or more processors 616 may be microprocessors, logic circuitry (e.g., logic gates, flip-flops, etc.) hard-wired into the device 110 itself, or may be a dedicated application specific integrated circuit (ASIC). It should be understood that the one or more processors 616 are not limited to hard-wired logic circuitry, but may also include any commercially available processing unit, or any hardware-based processors, such as a field programmable gate array (FPGA). In some examples, the one or more processors 616 may include a state machine. The processors 616 may be configured to execute the instruction 615 to, for example, perform a method such as described below in connection with FIG. 7.

The one or more sensors 618 may include any of a variety of mechanical or electromechanical sensors for detecting pre-warming events or conditions relevant to other operations. Such sensors may include, for example, an accelerometer, gyroscope, switch, light sensor, barometer, audio sensor (e.g., microphone), vibration sensor, heat sensor, radio frequency (RF) sensor, etc.

The short range wireless pairing interface 619 may be used to form connections with other devices, such as paired primary device or host device. The connection may be, for example, a Bluetooth connection or any other type of wireless pairing. By way of example only, connections with other devices may include an ACL link. The interface 619 may also be used to form a backchannel communication link with another wirelessly paired device. For example, where the secondary device 120 is an earbud, it may form a backchannel communication link with another earbud. This backchannel link may include a Bluetooth link, such as BLE, an NFMI link, or other types of links.

Although FIG. 6 functionally illustrates the processor, memory, and other elements of device 110 as being within the same block, it will be understood by those of ordinary skill in the art that the processor and memory may actually include multiple processors and memories that may or may not be stored within the same physical housing. For example, memory 612 may be a volatile memory or other type of memory located in a casing different from that of computing device 110. Moreover, the various components described above may be part of one or more electronic devices.

Figure 7:
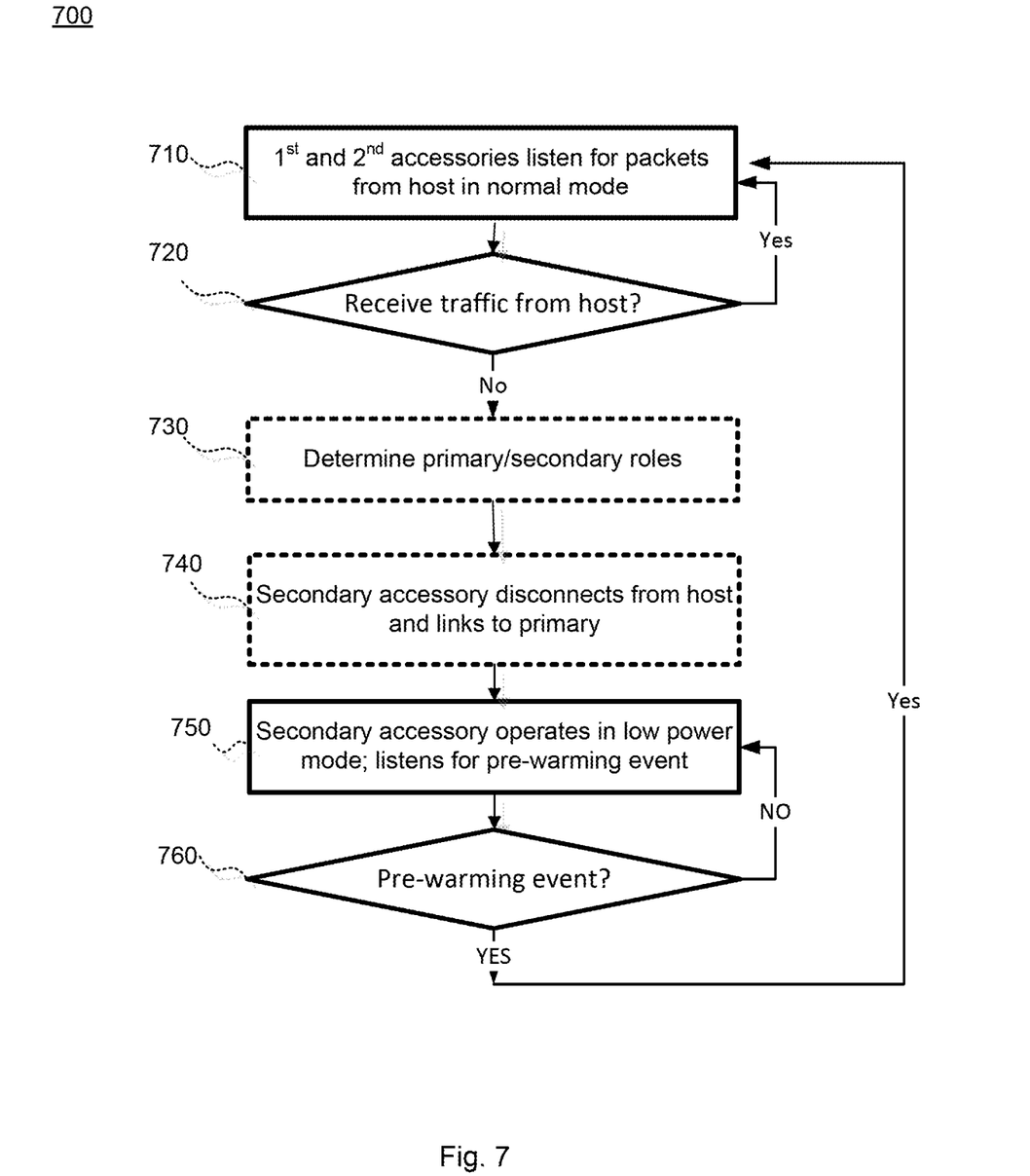
FIG. 7 is a flow diagram illustrating an example method according to aspects of the disclosure.

FIG. 7 is a flow diagram illustrating an example method 700 of switching between a normal operating mode in which a wireless accessory listens for media packets from a host device, and a power-save mode in which features and functions are powered down beyond a conventional standby mode. While the operations are illustrated and described in a particular order, it should be understood that the order may be modified and that operations may be added or omitted.

In block 710, first and second accessories listen for media packets from a host device. The first and second accessory devices operate in a normal mode, where they can receive the packets, buffer audio or other data from the packets, and playback the audio or other content. The first and second devices may continue operating in this normal mode until they detect, in block 720, that traffic is no longer received from the host.

When the accessories are no longer receiving traffic from the host, at least one of the first and second accessories transitions to a power-save mode. Where the accessories normally operate in primary/secondary roles, the primary device may enter a standby mode whereas the secondary device transitions to the power-save mode. Where the accessories normally operate independently with separate connections to the host, the accessories may first determine primary and secondary roles for themselves (block 730). For example, the accessories may execute a negotiation protocol to determine which will serve the primary role, such as based on signal strength, battery levels, etc. The device taking on the secondary role may disconnect from the host and link to the primary device, such as through a backchannel communication link (block 740).

In block 750, the secondary accessory operates in the power-save mode. In this mode the secondary accessory may consume only a very small amount of power. For example, the secondary accessory may turn off many of its functionalities, except for listening for pre-warming events. Such listening for pre-warming events may include listening for communications from the primary accessory over the backchannel communication link, sniffing for traffic from the host, etc.

If a pre-warming event is detected in block 760, the secondary accessory may return to the normal listening mode. Otherwise, the secondary accessory may remain in the power-save mode until a pre-warming event is detected.

While vendors of Bluetooth audio devices are typically limited as to how low the duty cycle can be due to a need to limit latency, the present system and method allow part of a system of wirelessly paired accessory devices to save battery more aggressively, while hiding the latency impact from the user. Moreover, since a communication link between the devices is under the control of the vendor, it is possible to use parameters that are standard Bluetooth specifications, even when the accessories connect to legacy devices. Combining the aggressive power saving with periodic role switching provides for battery levelling and increases an amount of time the devices can be used before requiring recharge.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of power conservation in a wireless accessory, comprising:
   operating in a normal mode, including receiving, at the wireless accessory, media packets transported over a first link from a host device, including receiving the media packets through another wireless accessory;
   determining, by the wireless accessory, that the media packets are no longer being received from the host device;
   switching, by the wireless accessory, to a power save mode in response to determining that the media packets are no longer being received;
   listening, by the wireless accessory in the power save mode, for pre-warming notifications over a second link, wherein the pre-warming notifications comprise an indication that the wireless accessory may receive one or more additional media packets from the host, the second link being a backchannel communication link separate from the first link and making use of different technology than the first link; and
   in response to receiving the pre-warming notifications, returning to the normal mode.

2. The method of claim 1, wherein receiving media packets from the host comprises receiving media packets directly from the host device.

3. The method of claim 2, wherein switching to the power save mode further comprises:
   negotiating, with the an-other wireless accessory, primary and secondary roles; and
   establishing by the wireless accessory, the backchannel communication link with the other wireless accessory.

4. The method of claim 3, further comprising disconnecting, by the wireless accessory, from the host device.

5. The method of claim 1, wherein switching to the power save mode comprises turning off all functions except listening for notifications over the backchannel communication link.

6. The method of claim 1, further comprising providing feedback to the host device when returning to the normal mode, the feedback indicating that the wireless accessory is ready to receive media packets.

7. A system, comprising:
   a first wireless accessory device comprising:
     one or more processors;
     an interface for communicating with a host device, wherein the first wireless accessory is adapted to receive media packets from the host device; and
   a second wireless accessory device, comprising:
     one or more processors;
     an interface for communicating with the first wireless accessory device over a relay link and a separate backchannel communication link that makes use of different technology than the relay link, wherein the relay link is used to receive media packets relayed from the first wireless accessory;
   wherein the one or more processors of the second wireless accessory is further configured to determine that the media packets are no loner being transmitted by the host device and cause the second wireless accessory to switch to a power save mode in response to determining that the media packets are no longer being transmitted; and
   wherein the one or more processors of the second wireless accessory is further configured to switch operation of the second wireless accessory device between a normal operating mode in which the second wireless accessory device receives media packets, and a power-save mode in which the second wireless accessory device does not receive or playback media packets, and listens for a pre-warming event over the separate backchannel communication link, the pre-warming event providing a notification that the second wireless accessory may receive one or more additional media packets from the host device.

8. The system of claim 7, wherein the pre-warming event includes receiving the notification from the first wireless accessory device.

9. The system of claim 7, wherein the pre-warming event includes sniffing traffic from the host device.

10. The system of claim 7, wherein the first and second accessory devices are a pair of earbuds.

11. The system of claim 7, wherein the separate backchannel communication link is a Bluetooth channel tuned to a lower duty cycle than in normal operation.

12. The system of claim 7, wherein the separate backchannel communication link is a near field magnetic induction link.

13. The system of claim 7, wherein the separate backchannel communication link is a skin conductance link.

14. The system of claim 7, wherein each of the first and second wireless accessory devices are configured to switch between a primary role in which it communicates directly with the host device and a secondary role in which it receives relay traffic from the primary role device.

15. The system of claim 14, wherein each of the first and second wireless accessory devices are configured to switch between an independent operation mode in which the first and second wireless accessory devices each communicate directly with the host device and the primary/secondary roles.

16. The system of claim 7, wherein the first and second wireless accessory devices are configured to provide feedback to the host device regarding a switch from power save mode to the normal operating mode, such that the host device can provide feedback to a user at a same time the first and second wireless accessory devices provide audible feedback to the user.

17. A wireless accessory device, comprising:
a communication interface adapted to establish a backchannel communication link with another wireless accessory, the backchannel link making use of different technology than a first link;
a memory storing instructions for switching between a normal operating mode and a power save mode; and
one or more processors in communication with the communication interface and the memory, the one or more processors configured to:
cause the wireless accessory device to operate in a normal mode in which it receives media packets from a host device, the media packets relayed by the other wireless accessory over the first link;
determine that the media packets are no longer being transmitted by the host device;
cause the wireless accessory to switch to a power save mode in response to determining that the media packets are no longer being transmitted;
listen, in the power save mode, for pre-warming notifications over the backchannel communication link with the other wireless accessory, wherein the pre-warming notifications providing indication that the wireless accessory may receive one or more additional media packets from the host and the backchannel communication link is separate from the first link; and
in response to receiving the pre-warming notifications, cause the wireless accessory to return to the normal mode.

18. The device of claim 17, wherein the one or more processors are further configured to:
negotiate, with the other wireless accessory, which device will serve in a primary role and which device will serve in a secondary role;
establish the backchannel communication link with the other wireless accessory; and
disconnect from the host when the wireless accessory is serving in the secondary role in the power save mode.

19. The device of claim 17, wherein the power save mode is a mode in which all functions are turned off except for listening for notifications over the backchannel communication link.

\* \* \* \* \*